US008854307B2

(12) United States Patent
Ashcraft et al.

(10) Patent No.: US 8,854,307 B2
(45) Date of Patent: Oct. 7, 2014

(54) CONTROLLING BACKLIGHTS BASED ON ANGLE OF DISPLAY AND KEYBOARD BASE

(75) Inventors: Britt C Ashcraft, Tomball, TX (US); Eric Chen, Houston, TX (US); Rudy Widiaman, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 105 days.

(21) Appl. No.: 13/532,907

(22) Filed: Jun. 26, 2012

(65) Prior Publication Data
US 2013/0342462 A1 Dec. 26, 2013

(51) Int. Cl.
*G06F 3/02* (2006.01)
*G09G 5/00* (2006.01)
*G09G 3/36* (2006.01)

(52) U.S. Cl.
USPC ............ 345/168; 345/170; 345/172; 345/102

(58) Field of Classification Search
CPC ... G06F 3/0202; G06F 3/0219; G06F 3/0216; G06F 1/1616; G06F 3/0238; H04M 1/22; H03K 17/969; H03K 17/98; H01H 9/181; G09G 3/3406; G09G 2320/0646; G09G 2360/16; G09G 2330/021; G09G 2320/064; G09G 2320/0653; G09G 2320/068; G02B 26/02
USPC .................................. 345/168, 170, 172, 102
See application file for complete search history.

(56) References Cited

U.S. PATENT DOCUMENTS

| 2003/0197675 | A1* | 10/2003 | Sakurai ........................ 345/102 |
| 2006/0139326 | A1* | 6/2006 | Tsukamoto ................... 345/158 |
| 2009/0045986 | A1 | 2/2009 | Fabrenius et al. |
| 2010/0302169 | A1* | 12/2010 | Pance et al. .................. 345/170 |
| 2011/0128233 | A1* | 6/2011 | Aoike ........................... 345/170 |
| 2012/0306751 | A1* | 12/2012 | Massaro et al. ............... 345/168 |

FOREIGN PATENT DOCUMENTS

EP 2 017 694 A1 1/2009

* cited by examiner

*Primary Examiner* — Aneeta Yodichkas
(74) *Attorney, Agent, or Firm* — Milin N. Patel

(57) ABSTRACT

Example embodiments disclosed herein relate to turning on backlights of a keyboard. An angle of a display relative to a base or keyboard is determined or monitored. The backlights are turned on based on at least two values of the angle.

18 Claims, 5 Drawing Sheets

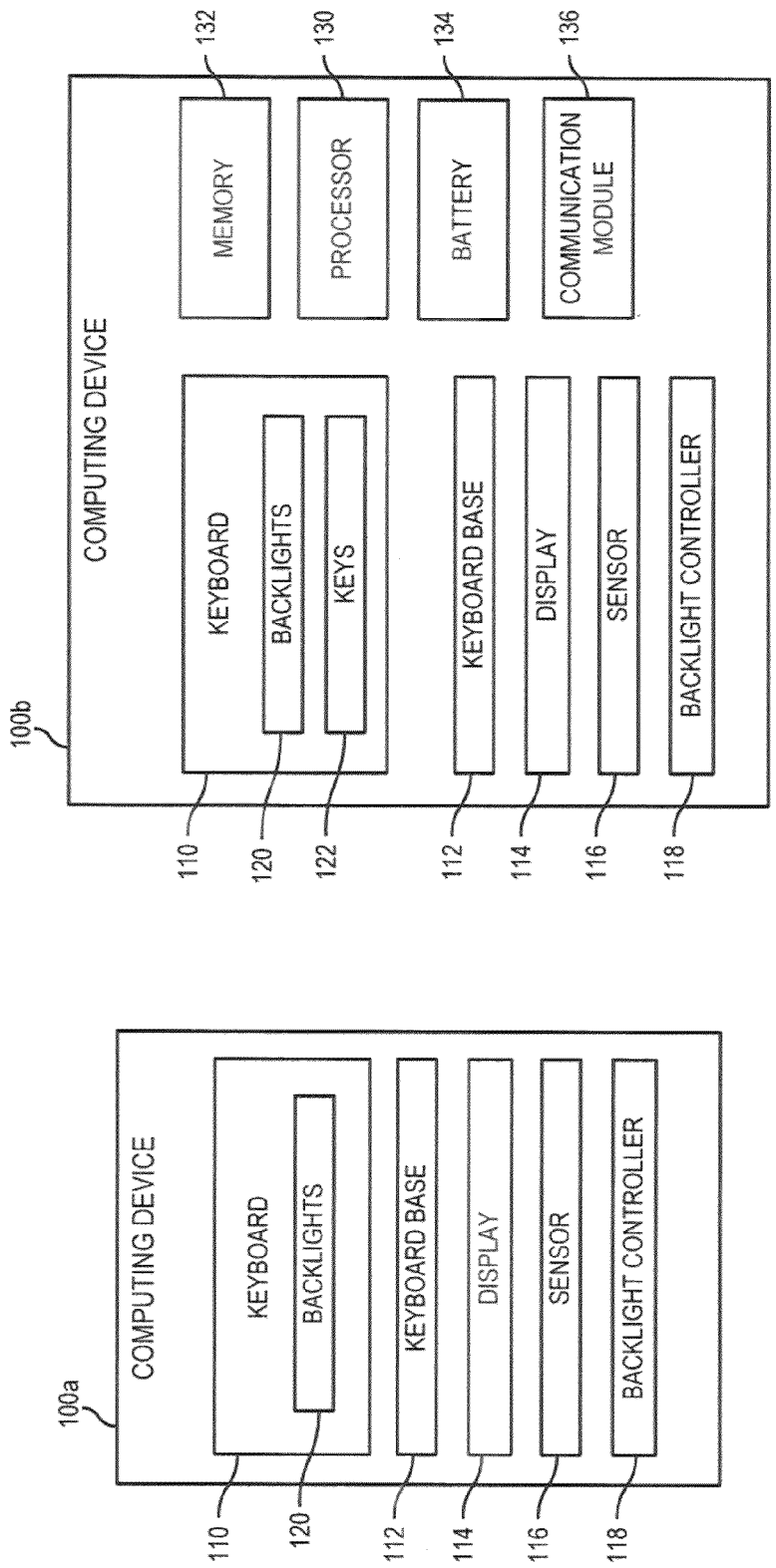

CONTROLLING BACKLIGHTS BASED ON ANGLE OF DISPLAY AND KEYBOARD BASE

BACKGROUND

Service providers and manufacturers are challenged to deliver quality and value to consumers, for example by providing backlit keyboards. Portable computing systems are often used in low light environments. It can be difficult for a user to see the keys of the keyboard while in such an environment. Backlit keyboards can illuminate the keys to provide light.

BRIEF DESCRIPTION OF THE DRAWINGS

The following detailed description references the drawings, wherein:

FIGS. 1A and 1B are block diagrams of computing devices including a keyboard with backlights that are controlled by an angle between the keyboard and a display, according to various examples;

DETAILED DESCRIPTION

Figure 2A:
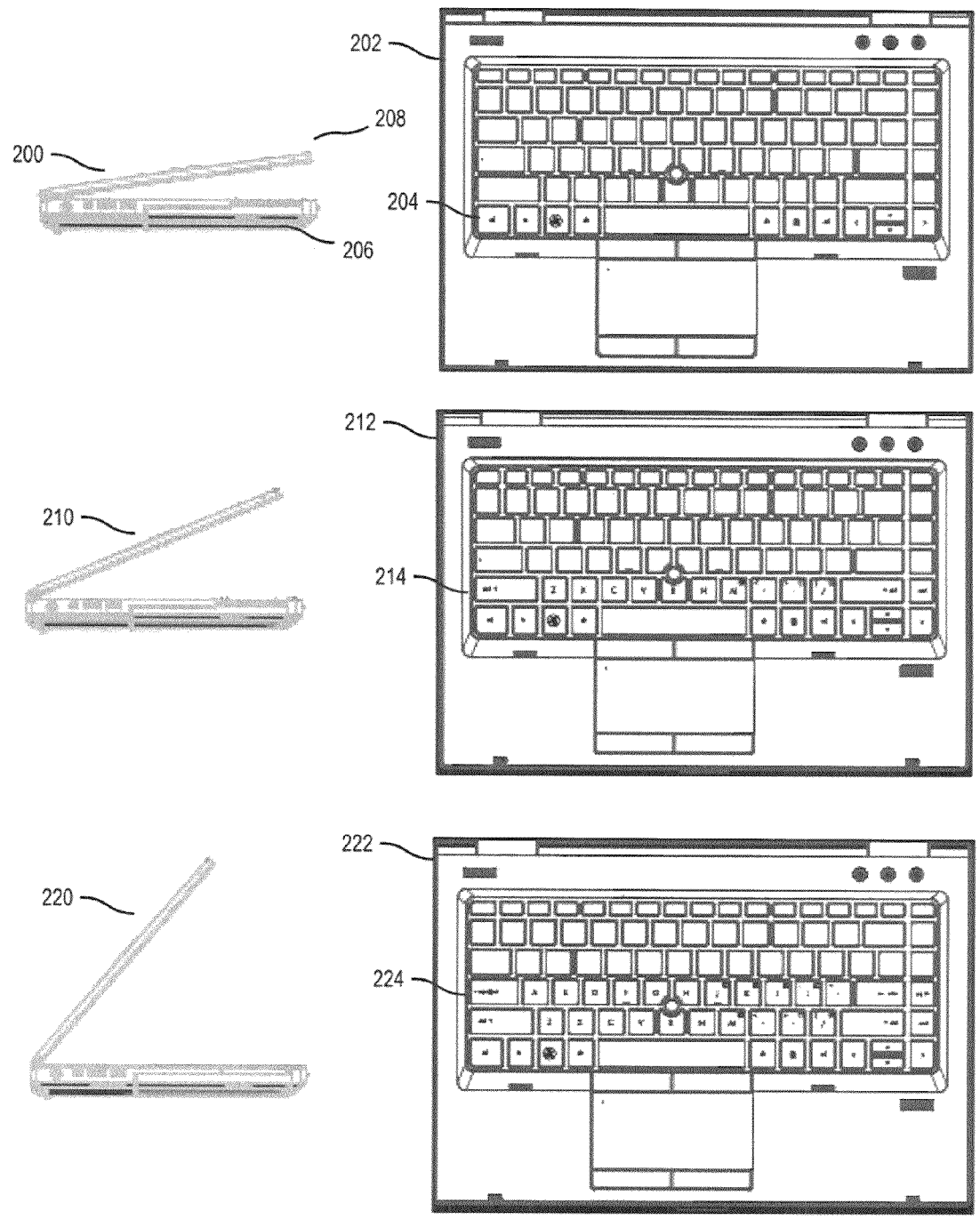
FIGS. 2A and 2B are diagrams showing the lighting of a keyboard based on an angle of a display in relation to the keyboard, according to various examples.

Manufacturers of computing devices such as laptop computers, netbook computers, mobile computing devices, etc. are challenged to provide improvements to usability of the computing devices. Further, manufacturers may wish to engage users and/or distinguish their products from other manufacturers.

Many mobile devices now include an illuminated or backlit keyboard. To distinguish a product from a manufacturer, the manufacturer can change approaches to how the keyboard is illuminated. This can be used to enhance user experience as well as distinguish the manufacturer's device from other competitors.

Accordingly, various embodiments disclosed herein relate to gradually turning on backlights for the keyboard as a display is being lifted. This can add to the functionality of the mobile device because the user is able to see keyboard being lit and can see the light produced. Further, the functionality can be aesthetically pleasing to the user. For example, the user may think that the approach used to light the keyboard is cool and may choose to purchase the device instead of another device because of the feature. The backlights can be turned on, for example, in a sequence, based on an angle associated with the base of the keyboard and the display. The display can be pivotally connected to the base, for example, as a laptop lid is connected to the rest of the laptop, including a keyboard and base. In certain examples, being pivotally connected means that a connection is made that can be used to turn the display. As further detailed below, a sensor can be used to monitor and/or determine the angle. The sensor readings can be reported to a controller that can be used to turn on or off the backlights. In certain examples, the controller can be programmed and set by a manufacturer and/or by a user at a later time, for example, via a firmware interface and/or a management instrumentation available using an operating system.

Referring now to the drawings, FIGS. 1A and 1B are block diagrams of computing devices including a keyboard with backlights that are controlled by an angle between the keyboard and a display, according to various examples. Computing devices 100a, 100b include components that can be utilized to determine the angle between the keyboard and the display and turn on the backlights accordingly. The respective computing devices 100a, 100b may be a notebook computer, a netbook, a mobile device with a keyboard and display integrated into a lid, or other like computing device. In one example, computing device 100a includes a keyboard 110 that can be associated with a keyboard base, a display 114, a sensor to determine the angle between the display 114 and the keyboard base 112, and a backlight controller 118 to control backlights 120 of the keyboard. In another example, computing device 100b can further include keys 122 of the keyboard as well as a processor 130, memory 132, a battery 134, a communication module 136, and/or additional components.

The keyboard 110 can include multiple backlights 120, for example, a first backlight, a second backlight, and a third backlight. Additional backlights can be included. For example, a backlight or multiple backlights 120 can be included for each of the keys 122. The keyboard 110 can be situated on or otherwise connected to a keyboard base 112. In certain scenarios, the keyboard base 112 can be considered part of the keyboard 110. In the example of a laptop computer, the keyboard base 112 may additionally include a mouse ball or track pad. A backlight is a form of illumination. This type of illumination can be implemented using incandescent light bulbs, light-emitting diodes (LEDs), electroluminescent panels (ELPs), fluorescent lamps, or other lighting sources.

The display 114 can be pivotally connected to the keyboard base 112. The display can be based on various technologies, such as liquid crystal display (LCD) technology, LED display technology, organic LED (OLED) technology, or the like. The display 114 can be a flat panel display. Further, the pivotal connection can include a hinge or multiple hinges. The pivotal connection can connect the keyboard base 112 to display 114 physically and/or electronically. For example, wires for display, power, etc. can be connected using the hinge or hinges.

A sensor 116 can be used to determine an angle of the display 114 relative to the keyboard base 112. The sensor 116 can be an angle measurement sensor. In certain examples, an angle measurement sensor can be used to measure an angle. An example of an angle measurement sensor includes a bend sensor or another sensor 116 that can determine the angle based on the hinge. For example, as a laptop monitor display is raised on its hinge, a resistance on the bend sensor can change. As such, the angle can be monitored. Other types of sensors can also be used, for example, a distance sensor disposed on the display 114 and/or keyboard base 112 that can be combined with information of physical dimensions of the computing device 100 to determine the angle. Other examples of sensors include tilt sensors, gyroscopes, angle transducers, potentiometers used to control voltage based on the angle, or the like. The sensor 116 or sensors 116 can be read as a digital value or an analog voltage value by the backlight controller 118 or another circuit providing the information to the backlight controller 118.

The backlight controller 118 turns on at least one of the backlights 120 based on the angle. For example, a first backlight is turned on based on the angle. Then, a second backlight can be turned on when another angle is reached. A third backlight can also be turned on when yet another angle is reached. Other backlights 120 can be turned on in such a manner.

The backlights 120 can turn on based on threshold levels associated with the angle. For example, the first backlight can be turned on when the value of the angle reaches at least a first threshold. The second backlight can be turned on when the value of the angle is at least at a second threshold. The second threshold can be greater than the first threshold. Further, the third backlight can be configured to be turned on when the value of the angle is at least a third threshold that is greater than the second threshold. More than three backlights can be associated with the computing device 100. Moreover, the value of the angles associated with the thresholds can depend on the number of thresholds. For example, if there are three backlights, the number of thresholds used can be three. In other examples, the amount of thresholds can be based on a function of the number of backlights, with certain thresholds associated with particular backlights.

In one example, the angle associated with the respective thresholds is based on the number of thresholds. For example, in the case of three thresholds, the angles associated can be 30 degrees, 60 degrees, and 90 degrees. Other angles can also be used. In one scenario, the first threshold is above a particular value, for example, 10 degrees. In another scenario, the difference between the angles is at least 10 degrees.

The backlights 120 can be turned on according to a sequence. For example, the first backlight can be associated with a first row of the keyboard 110, the second backlight associated with a second row, the third backlight associated with a third row, and the like. In other examples, respective backlights 120 can be associated with particular keys 122 and/or a zone of keys. In one example, a zone can be one or a group of backlights associated with a portion of the keys. For example, a zone can correspond to a row of keys, a column of keys, a group of keys, such as arrow keys, number keys, function keys, or the like. The backlights 120 can be turned on or illuminated according to a sequence, where a backlight or set of backlights is turned on or illuminated when an angle value is reached or exceeded.

Figure 2B:
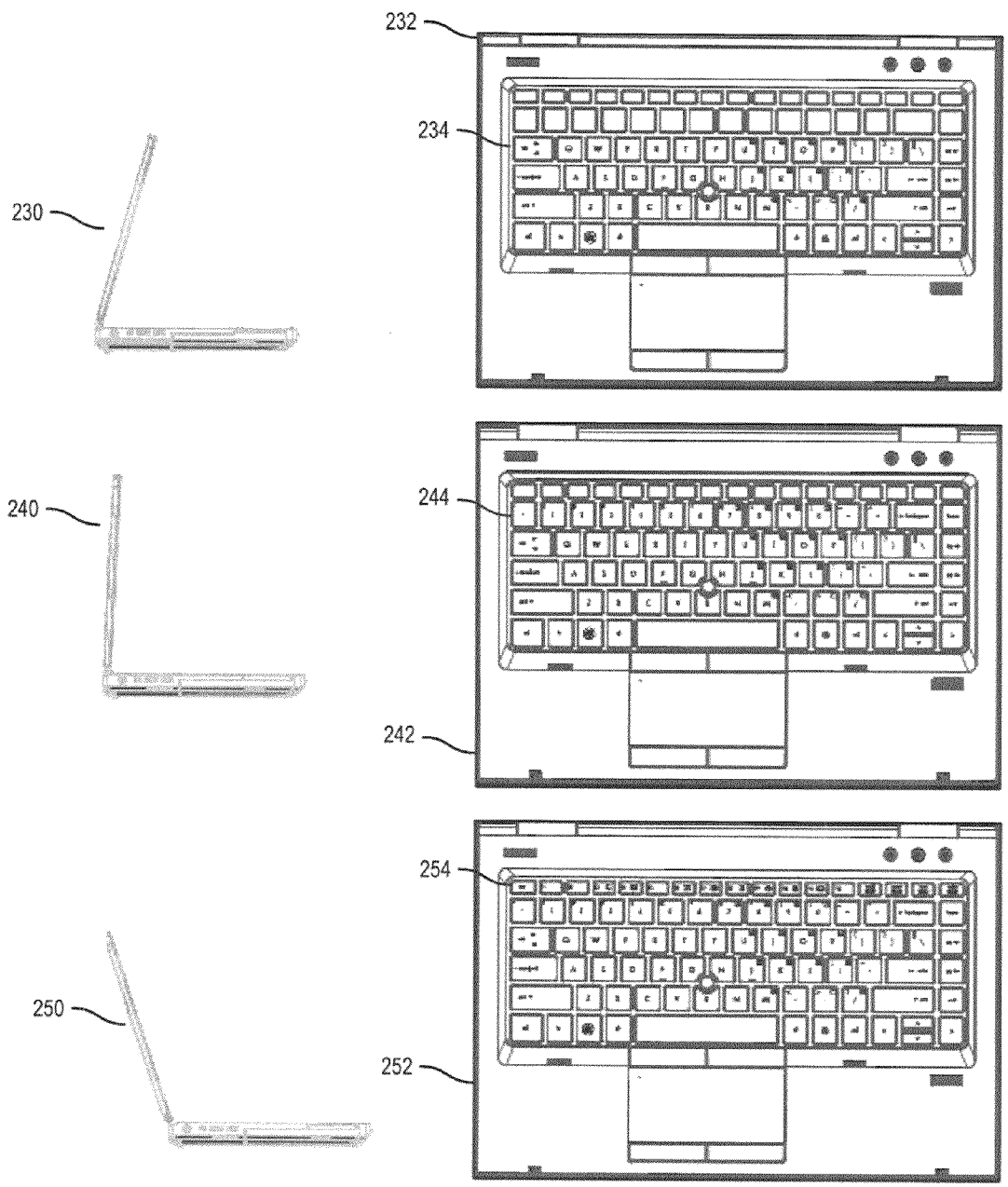

In one example, the keys 122 can be set up into rows. In one example, a row is a set of keys 122 of the keyboard 110 that are lined up horizontally. The first row can be the bottom of the keyboard, the second row can be the second from the bottom, the third row can be the next row up, etc. A first backlight or backlight set can correspond to the first row, the second backlight or backlight set to the second row, and the like. The sequence of lighting can be from the first row at a first angle to the second row at a second angle, to the third row at a third angle, and the like. As such, when the computing device 100 is opened, the first row is lit and as the computing device 100 opens more, additional keys are lit. Further examples are shown in FIGS. 2A and 2B.

Turning on the respective backlights 120 can be accomplished by the backlight controller 118 using various mechanisms. In one example, the backlight controller 118 can control a switch to allow current to pass through the light. In another example, the backlight controller 118 may provide power, via a signal, to allow current to flow through the light source. Further, the backlight controller 118 may control other circuitry to turn on or off the respective backlights.

A processor 130, such as a central processing unit (CPU) or a microprocessor suitable for retrieval and execution of instructions and/or electronic circuits can be configured to perform the functionality of any of the modules that can be used to implement control of backlighting and/or to communicate with the backlight controller 118. In certain scenarios, instructions and/or other information, such as a sequence of backlights to turn on, can be included in memory 132 or other memory. Input/output interfaces may additionally be provided by the computing device 100b. For example, input devices, such as a keyboard, a sensor, a touch interface, a mouse, a microphone, etc. can be utilized to receive input from an environment surrounding the computing device 100b. Further, an output device, such as a display, can be utilized to present information to users. Examples of output devices include speakers, display devices, amplifiers, etc. Moreover, in certain embodiments, some components can be utilized to implement functionality of other components described herein. Input/output interfaces can also include a communication module 136 that may be used to communicate between the computing device 100b and other devices.

The communication module 136, the backlight controller 118, and other components may include, for example, hardware devices including electronic circuitry for implementing the functionality described herein. In addition or as an alternative, each component may be implemented as a series of instructions encoded on a machine-readable storage medium of computing device 100 and executable by processor 130 or backlight controller 118. It should be noted that, in some embodiments, some modules are implemented as hardware devices, while other modules are implemented as executable instructions.

With a computing device such as a laptop computer or netbook, user interaction and immersion can be improved by providing keyboard backlights that light up in accordance with a sequence. As noted, an example sequence would be turning on the backlights 120 row by row as the user opens the lid, which may include a display, from the computing device.

FIGS. 2A and 2B are diagrams showing the lighting of a keyboard based on an angle of a display in relation to the keyboard, according to various examples. This example is shown using a laptop computer, but other computing devices with a hinge between a base with a keyboard and a display may be used. Computing system diagram states 200, 210, 220, 230, 240, and 250 show example states of the computing device. An angle between the base 206 and the display panel 208 can be measured, for example, by using a sensor. In one example, the sensor can measure the angle at a hinge. In another example, a distance sensor can be placed on the base or display panel and the angle can be measured based on the distance based on known distance of where the display panel would be in relation to the keyboard.

Diagrams 202, 212, 222, 232, 242, and 252 show illuminated rows 204, 214, 224, 234, 244, 254 at the state of the respective diagrams 202, 212, 222, 232, 242, 252. As the laptop is opened at state 200, a first row 204 is illuminated. Then, as the laptop is opened to state 210, a second row 214 is also illuminated. As the user opens the laptop more, at state 220, a backlight or set of backlights associated with the third row 224 is illuminated. Similarly, at states 230, 240, and 250, rows 234, 244, and 254 are further illuminated.

In certain scenarios, other groups of keys can be illuminated according to the angle between the laptop lid and the laptop base. Further, the sequence of what areas of the keyboard that are illuminated at what angles can be programmed. For example, the keyboard backlights can be illuminated according to rows as shown, rows in reverse of what is shown in FIGS. 2A and 2B, according to columns of keys, by other groups of keys, start at a key or set of keys and illuminate in a pattern moving outward from the key, or the like. Further, in certain examples, instead of being a binary decision to turn on or off the backlights, the intensity of light may be controlled. For example, when at state 200, row 204 can be illuminated brightly while the other rows are dim or off. As the laptop is opened, the other rows can become brighter.

Figure 3:
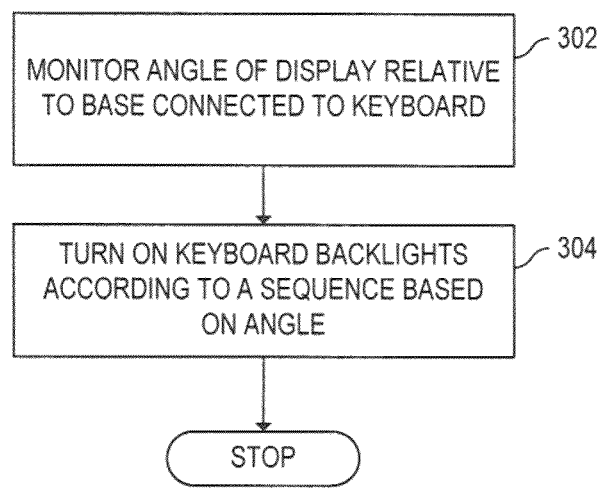
FIG. 3 is a flowchart of a method for turning on keyboard backlights according to a sequence based on an angle of a display in relation to a keyboard, according to one example.

FIG. 3 is a flowchart of a method for turning on keyboard backlights according to a sequence based on an angle of a display in relation to a keyboard, according to one example. Method 300 may be implemented in the form of executable instructions stored on a machine-readable storage medium and/or in the form of electronic circuitry.

At 302, an angle of a display relative to a base connected to a keyboard can be monitored. The base can be pivotally connected to the display. The display can be a panel, for example, as used in laptop computers and/or netbooks. One or more pivot connectors can be used. Further, in certain scenarios, the pivots can be associated with wires to connect the base with the display. Moreover, a sensor can be used to monitor the angle. As noted above, an angle can be monitored using an angle measurement sensor such as a bend sensor, an angle transducer, a distance sensor, a gyroscope, a potentiometer, or other suitable sensor to monitor an angle. A controller can be used to monitor the angle. In certain scenarios, the controller can determine a value of the angle, which may be scaled or not scaled based on the sensor. For example, the sensor may output a resistance or digital value that can be received by the controller. The controller may have information to translate the value to an angle and/or can use the raw value in its calculations.

The keyboard can include multiple backlights. In one example, one or more backlights can be associated with each key of the keyboard. In another example, one or more backlights can be associated with each row, column, or other portion of the keyboard. In certain scenarios, multiple backlights can be controlled simultaneously by the controller. In other scenarios, the backlights can be controlled individually.

At 304, the backlights can be turned on according to a sequence based on at least two values of the angle. In this scenario, the value of the angle can be monitored. When the first value of the angle arrives at or goes past a threshold, a first backlight or set of backlights of the sequence can be illuminated. When the second value of the angle reaches or passes another threshold value, a second backlight or set of backlights of the sequence can be illuminated. This process can go on, for example, at third, fourth, fifth, sixth, etc, thresholds. The sequence of backlights can be ordered, for example, based on rows, columns, areas of the keyboard, or otherwise programmed to a specific sequence. In certain examples, the sequence can be programmed using a management instrumentation to program the controller using an operating system executing on the computing device or via a firmware system.

In one example, the keyboard can include a plurality of rows of keys. The sequence can include turning on the respective backlights associated with the respective rows based on whether one of the values of the angle meets and/or exceed a threshold. An example of this procedure is described referring to FIGS. 2A and 2B.

In another example, the sequence of backlighting the keys can start at a key and fan out. Further, in yet another example, the sequence can start at one side or corner of the keyboard and fan out to the other end or corner. In another example, other patterns can be used, such as lighting every other key sequentially. In some examples, this can be extended to lighting every other key sequentially and then backlighting the other keys. Additionally, the backlights can include multiple different colors, for example, by using tri color LEDs for backlighting. In this scenario, colors can change while opening the display.

Figure 4:
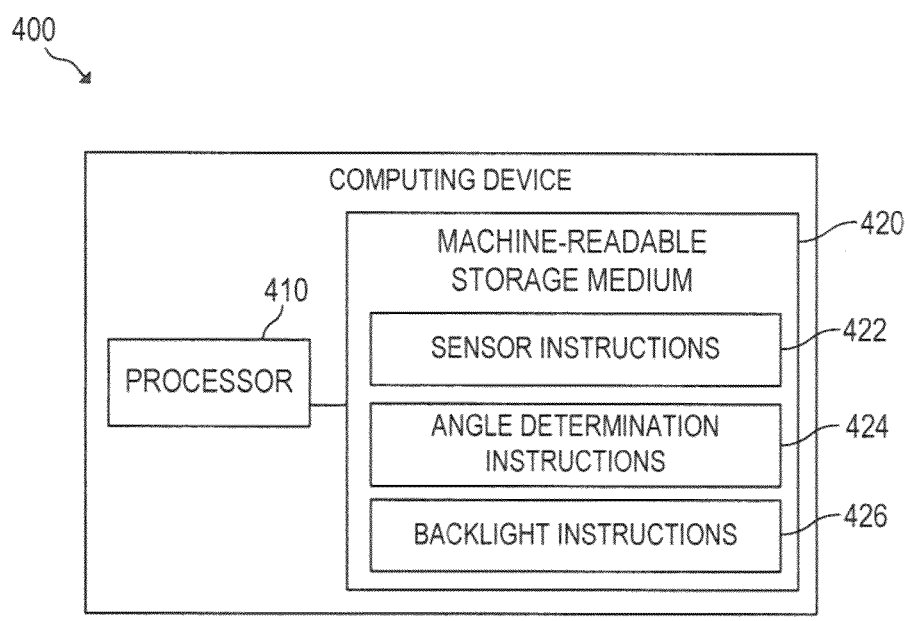
FIG. 4 is a block diagram of a computing device including a keyboard that is backlit based on an angle between the keyboard and a display, according to one example.

FIG. 4 is a block diagram of a computing device including a keyboard that is backlit based on an angle between the keyboard and a display, according to one example. The computing device 400 includes, for example, a processor 410, and a machine-readable storage medium 420 including instructions 422, 424, 426 for illuminating a backlit keyboard based on an angle between the keyboard and a display. Computing device 400 may be, for example, a notebook computer, a laptop computer, a mobile computer, or any other computing device with a lid that closes onto a backlit keyboard.

Processor 410 may be, at least one central processing unit (CPU), at least one semiconductor-based microprocessor, at least one graphics processing unit (GPU), other hardware devices suitable for retrieval and execution of instructions stored in machine-readable storage medium 420, or combinations thereof. For example, the processor 410 may include multiple cores on a chip, include multiple cores across multiple chips, or combinations thereof. Processor 410 may fetch, decode, and execute instructions 422, 424, 426 to implement method 300 or otherwise control backlighting of a keyboard based on an angle between the keyboard and a display. As an alternative or in addition to retrieving and executing instructions, processor 410 may include at least one integrated circuit (IC), other control logic, other electronic circuits, or combinations thereof that include a number of electronic components for performing the functionality of instructions 422, 424, 426.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for backlighting portions of the keyboard based on an angle between the keyboard and a display.

Sensor instructions 422 can be used to monitor the value of a sensor. The value can change and the processor can read additional values of the sensor. As described above, the sensor can be used to determine an angle between the keyboard and/or keyboard base and the display. Further, the display can be pivotally connected to the keyboard base. As such, the angle can be measured at the pivot. The value of the sensor that is being monitored can change, which can represent the changing of the angle.

Angle determination instructions 424 can execute on the processor 410 to determine a representation of the angle. The measurement of the angle can be used to turn on backlights of the keyboard. The keyboard can include multiple backlights that can be controlled. The backlights can be controlled individually and/or in sets. One of the backlights can be turned on based on the angle using backlight instructions 426 executed on the processor 410. For example, the backlight can be turned on when the angle reaches a threshold. Further, other backlights can be controlled based on the angle according to a sequence. The sequence can be stored in a memory that can be read by the processor 410.

Further, the processor 410 can determine another angle. The other angle can be used to turn on another one or more of the backlights according to a sequence that is based on the second angle. In one example, when a threshold is met, the next backlight and/or set of backlights of the sequence can be lit. In other examples, some of the backlights that are turned on can turn off as part of the sequence.

In one example, the backlights can each be associated with a row of keys of the keyboard. The sequence can be based on the rows of keys. For example, the first row to light up can be the bottom row, followed by the next row, and so on. In another example, the first row to light up can be the top row and work downwards. Illuminating the backlights from the bottom row to the top row allows for a user to see the closest lights to the user turn on first while other lights are turned on later. This sleek display can look cool to users and potential customers and can be used as a feature to help a user select one computing device over another.

What is claimed is:

1. A computing device comprising:
   a keyboard with a first backlight and a second backlight;
   a base connected to the keyboard;
   a display pivotally connected to the base;
   a sensor to determine angle information of the display relative to the base; and
   a processor to execute instructions to control the computing device;
   a backlight controller separate from the processor to receive the angle information and to turn on the first backlight of the keyboard at a first value of the angle information and the second backlight of the keyboard at a second, different, value of the angle information.

2. The computing device of claim 1, further comprising:
   a third backlight of the keyboard, wherein the backlight controller turns on the third backlight based on a third, different, value of the angle information.

3. The computing device of claim 2, wherein the first keyboard backlight is turned on when the first value of the angle information is at least at a first threshold.

4. The computing device of claim 3, wherein the second keyboard backlight is turned on when the second value of the angle information is at least at a second threshold greater than the first threshold.

5. The computing device of claim 4, wherein the third keyboard backlight is turned on when the angle information is at least at a third threshold greater than the second threshold.

6. The computing device of claim 5, further comprising:
   a first row of keys, a second row of keys, and a third row of keys,
   wherein the first keyboard backlight corresponds to the first row, the second keyboard backlight corresponds to the second row, and the third keyboard backlight corresponds to the third row.

7. The computing device of claim 5, wherein the keyboard backlights are associated with areas of the keyboard, and first, second, and third keyboard backlights are turned on according to a pattern.

8. The computing device of claim 7, wherein the pattern includes starting at one of the backlights associated with a key of the keyboard and illuminating the keyboard outward from the key.

9. The computing device of claim 7, wherein the areas correspond to rows of keys and the pattern is to illuminate the keys from a bottom row of the keyboard to a top row of the keyboard.

10. The computing device of claim 1, wherein the sensor includes at least one of a bend sensor, a distance sensor, and a potentiometer.

11. A non-transitory machine-readable storage medium storing instructions that, if executed by at least one controller of a device, cause the device to:
    monitor an angle of a display relative to a base connected to a keyboard,
    wherein the display is pivotally connected to the base, and wherein the keyboard includes a plurality of backlights;
    determine a plurality of values of the angle of the display relative to the base;
    turn on at least three of the keyboard backlights according to a sequence based on the values,
    wherein the keyboard backlights are each associated with a row of keys of the keyboard, and wherein the sequence is to illuminate the rows of keys one by one based on the respective values.

12. The non-transitory machine-readable storage medium of claim 11, wherein when the value meets a threshold, one of the at least three keyboard backlights is turned on.

13. The non-transitory machine-readable storage medium of claim 11, further comprising instructions that, if executed by the at least one controller, cause the device controller to:
    receive the values from a sensor.

14. The non-transitory machine-readable storage medium of claim 11, wherein the sequence is further to illuminate the rows of the keys from a bottom row of the keyboard to a top row of the keyboard.

15. A method comprising:
    monitoring an angle of a display relative to a base connected to a keyboard to determine angle information,
    wherein the display is pivotally connected to the base, and wherein the keyboard includes a plurality of keyboard backlights,
    wherein the keyboard backlights are each associated with a row of keys of the keyboard; and
    turning on the keyboard backlights according to a sequence based on at least three values of the angle information, wherein the sequence is to illuminate the rows of the keys one by one according to the values of the angle information.

16. The method of claim 15, further comprising:
    determining the at least three values based on a sensor.

17. The method of claim 15,
    wherein the respective rows are turned on when a respective threshold of the values is met for the respective keyboard backlight.

18. The method of claim 15, wherein the sequence is further to illuminate the rows of the keys from a bottom row of the keyboard to a top row of the keyboard.

* * * * *

UNITED STATES PATENT AND TRADEMARK OFFICE
CERTIFICATE OF CORRECTION

| | | |
|---|---|---|
| PATENT NO. | : 8,854,307 B2 | Page 1 of 1 |
| APPLICATION NO. | : 13/532907 | |
| DATED | : October 7, 2014 | |
| INVENTOR(S) | : Britt C Ashcraft et al. | |

It is certified that error appears in the above-identified patent and that said Letters Patent is hereby corrected as shown below:

In the Claims:

In column 8, line 27, in Claim 13, after "the" delete "device".

Signed and Sealed this
Twenty-fourth Day of March, 2015

Michelle K. Lee
*Director of the United States Patent and Trademark Office*